A. WIETLISBACH.
Wheels for Vehicles.
No. 158,342. Patented Dec. 29, 1874.
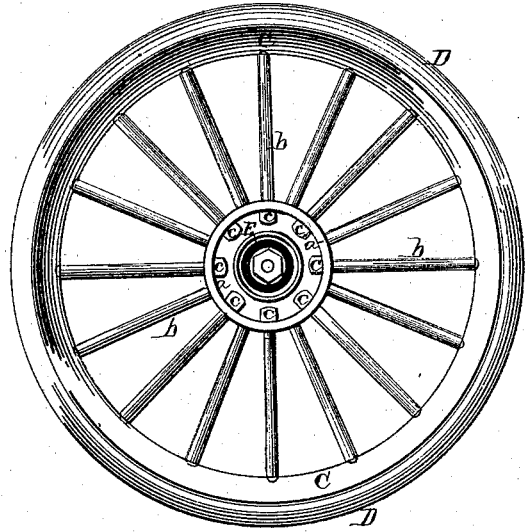
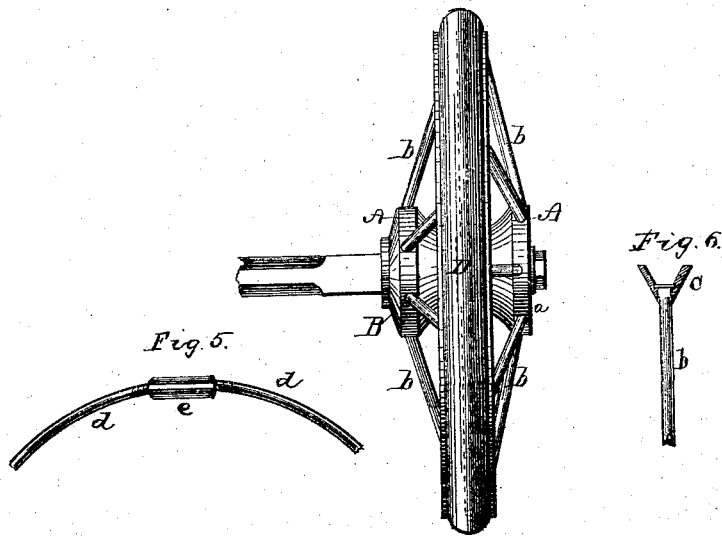
WITNESSES.
J. Wm. Garner.
Jno. Leland.
INVENTOR
Albin Wietlisbach
per
Drake & Co. Attys.

UNITED STATES PATENT OFFICE.

ALBIN WIETLISBACH, OF NEWARK, NEW JERSEY.

IMPROVEMENT IN WHEELS FOR VEHICLES.

Specification forming part of Letters Patent No. 158,342, dated December 29, 1874; application filed November 10, 1874.

*To all whom it may concern:*

Be it known that I, ALBIN WIETLISBACH, of the city of Newark, in the county of Essex and State of New Jersey, have invented certain new and useful Improvements in Wheels; and I do hereby declare that the following is a full, clear, and exact description thereof, which will enable others skilled in the art to which it pertains to make and use the same, reference being had to the accompanying drawings, and to the letters of reference marked thereon, which form a part of this specification.

This invention relates to certain improvements in the constructions of wheels for vehicles; and has for its object increased elasticity, durability, and beauty.

In the accompanying drawing, Figure 1 is a side elevation of my wheel, with the outside plate removed. Fig. 2 is an edge view of the same; and Figs. 5 and 6 are detail views of the same.

The hub A, which is made of metal, and adapted to receive any ordinary axle, has a recess in each end, which, of course, leaves projecting flanges $a$ $a$, through which the rods or spokes $b$ pass, and are secured, by screw-nuts $c$, inside of said flanges, and are covered by caps B, which are secured by screws, and serve the purpose of covering the nut $c$, and prevents them from turning and becoming loose, and also imparts a neat finish to the ends of the hubs. The spokes or rods $b$ pass into, or through, the felly or rim C of the wheel, and are secured thereto or therein in such a manner as that they will be immovable.

In the drawing is illustrated a wheel having a felly or rim, the outer surface of which is grooved and surrounded by a rubber band, D, composed of ordinary rubber tubing, through which passes a rod or wire, $d$, the two ends of which have a screw-thread cut thereon, adapted to screw into an elongated nut, $e$, having a right-and-left thread, by means of which the said rod or wire may be made perfectly tight, and forcing said rubber band into said groove, so that it cannot be displaced by accident.

This device is designed and well adapted to ambulances and other purposes in which stillness is requisite or desirable.

The rim C, as above set forth, may also be composed of wood and iron combined, two forms of which are illustrated in the drawing, one of which, Fig. 4, is a felly constructed in the ordinary manner, the rods passing through the felly, and covered by the tire, as shown, and the other, Fig. 3, (a strip of wood between two bands of iron or other metal,) secured by bolts passing through the whole at proper intervals, the rods being secured in the inner bands; the object of which is to impart increased strength and elasticity.

It will be observed that the ends of the rods $b$, which pass through the flanges of the hubs, are movable therein, the result of which is that the tension is sustained by the upper rods or spokes, instead of the lower spokes being subjected to the pressure when a vehicle is loaded, as in ordinary cases, the advantage of which is obvious.

A cap, E, is screwed into the front end of the hub, which serves to cover the end of the axle, and also as a receptacle for oil to lubricate said axle, and is so perfectly fitted and adjusted as to retain a quantity sufficient for a number of days.

Having thus described my invention, what I claim as new, and desire to secure by Letters Patent of the United States, is—

The combination of the hub A, spokes $b$, rim C, and rubber tire D, the tire being composed of tubing, and secured in position by the screw-rod $d$ and double-acting nut $e$, substantially as shown and described.

In testimony that I claim the foregoing as my own invention I affix my signature in presence of two witnesses.

ALBIN WIETLISBACH.

Witnesses:
XAVER MEYER,
JACQUES HOLTZMANN.